(12) United States Patent
Kirsch et al.

(10) Patent No.: US 10,887,429 B1
(45) Date of Patent: Jan. 5, 2021

(54) PROCESSING MULTI-PROTOCOL REDIRECTION LINKS

(71) Applicant: EMC Corporation, Hopkinton, MA (US)

(72) Inventors: Nick Kirsch, Seattle, WA (US); Steve Hubbell, Seattle, WA (US); Alex Pecoraro, Huntersville, NC (US); Siva Muhunthan, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 443 days.

(21) Appl. No.: 14/788,412

(22) Filed: Jun. 30, 2015

(51) Int. Cl.
*H04L 29/06* (2006.01)
*H04L 29/08* (2006.01)

(52) U.S. Cl.
CPC .............. *H04L 67/42* (2013.01); *H04L 67/06* (2013.01); *H04L 67/1097* (2013.01); *H04L 69/18* (2013.01)

(58) Field of Classification Search
CPC ..... H04L 67/42; H04L 67/06; H04L 67/1097; H04L 69/18
USPC .................................................. 709/203, 239
See application file for complete search history.

(56) References Cited

U.S. PATENT DOCUMENTS

| | | | | |
|---|---|---|---|---|
| 7,987,167 B1* | 7/2011 | Kazar | ...................... | G06F 16/13 707/705 |
| 8,041,735 B1* | 10/2011 | Lacapra | ............ | G06F 17/30194 707/783 |
| 9,015,123 B1* | 4/2015 | Mathew | ................. | G06F 16/178 707/646 |
| 2005/0192918 A1* | 9/2005 | DeLorme | .......... | G06F 17/30067 |
| 2007/0088702 A1* | 4/2007 | Fridella | ............. | G06F 17/30123 |

(Continued)

OTHER PUBLICATIONS

U.S. Appl. No. 14/788,381, filed Jun. 30, 2015, 23 pages.

*Primary Examiner* — David R Lazaro
*Assistant Examiner* — Mariegeorges A Henry
(74) *Attorney, Agent, or Firm* — Krishnendu Gupta; Nikhil Patel (57) ABSTRACT

Implementations are provided herein for establishing multi-protocol redirection links that are associated with an object, a file, a set of files, directories, etc. The multi-protocol redirection link can transparently redirect a client to a different part of the namespace or even to a different storage cluster to access data. For example, using multi-protocol redirection links, a single namespace in a cluster of nodes can be scaled up with multiple secondary storage clusters being the eventual redirect path. A multi-protocol redirection table can be established as a basis for the multi-protocol redirection link. The file system can be aware of discriminative information associated the client, for example, the network protocol the client is using, the access zone the client is connecting to, user identification of the client, group identification of the client, geography of the client, etc. This discriminative information can then be used to establish dynamic multi-protocol redirection links in the multi-protocol redirection table for any host of eventualities. It can be appreciated that by having a single multi-protocol redirection link associated with a file and/or directory, no matter how the client is accessing the content, no matter the state of the file system, the multi-protocol redirection link can transparently redirect the client to the appropriate redirect path.

21 Claims, 9 Drawing Sheets

(56) References Cited

U.S. PATENT DOCUMENTS

| | | | |
|---|---|---|---|
| 2009/0006468 A1* | 1/2009 | Shankar | G06F 16/13 |
| 2012/0089781 A1* | 4/2012 | Ranade | H04L 67/1097 |
| | | | 711/118 |
| 2013/0204849 A1* | 8/2013 | Chacko | G06F 3/0604 |
| | | | 707/692 |
| 2013/0246393 A1* | 9/2013 | Saraf | G06F 17/30238 |
| | | | 707/718 |
| 2015/0067004 A1* | 3/2015 | Shvachko | G06F 17/30194 |
| | | | 707/827 |

* cited by examiner

FIG. 1

| CONTACT CLUSTER PATH | NETWORK PROTOCOL | UID/GID | ACCESS ZONE | PERFORMANCE PROFILE | GEOGRAPHY | REDIRECT PATH |
|---|---|---|---|---|---|---|
| FOO\BAR | NFS | GID: 001-020 | | | | NFS MOUNT 2 |
| FOO\BAR\OBJECT | NFS | GID: MARKETING | | | | OBJECT.MARKTING.TXT |
| FOO\BAR\OBJECT | NFS | GID: ACCOUNTING | | | | OBJECT.ACCOUNTING.TXT |
| FOO\BAR\OBJECT | SMB | | | | | OBJECT.SMB |
| FOO\BAR\OBJECT2 | HDFS | SET A | HDFS 1 | ANY | NORTH AMERICA | CLUSTER 2 |
| FOO\BAR\OBJECT2 | HDFS | SET A | HDFS 1 | ANY | OUTSIDE NORTH AMERICA | CLUSTER 3 |
| FOO\BAR\OBJECT3 | LEGACY | | | | | LEGACY PLATFORM |
| FOO\BAR\OBJECT4 | ANY | ANY | ANY | CACHED DATA | ANY | CACHE LOCATION |

PROCESSING MULTI-PROTOCOL REDIRECTION LINKS

FIELD OF THE INVENTION

This invention relates generally to data tenancy, and more particularly to systems and methods for establishing and using multi-protocol redirect links in a distributed file system.

BACKGROUND OF THE INVENTION

Distributed file systems offer many compelling advantages in establishing high performance computing environments. One example is the ability to easily expand, even at large scale. Another example is the ability to support multiple unique network protocols. For example, a cluster of nodes operating together to function as a distributed file system can support connections from clients using different network protocols. One storage client can access the distributed file system using the Network File System ("NFS") protocol, a second using the Server Message Block ("SMB") protocol, and the third using the Hadoop Distributed File System ("HDFS") protocol. Not only can different clients access the distributed file system under different protocols, multiple clients of a single protocol can also access the distributed file system.

With multiple clients connecting to a single distributed file system objects, files or directories that exist within the file system may be accessed by more than one client using more than one protocol. An administrator of the distributed file system, however, may wish to redirect users attempting to access an object, to a variant more appropriate for their network protocol, permissions, geographical location, etc. For example, an object called "orientation.txt" may exist as an object; however, if an engineer accesses the file, it may be desirable to have them see a version of the object suited for their role, while a marketing professional may desire to see a different version of the object suited for their needs.

One means to provide for differing versions of data depending on who or how the data is being accessed would be to establish separate objects for each variant with an expectation that the client would know which version of the object they are seeking. However, that creates high amounts of complexity on the client, who may not always be aware of how data is organized within the file system. This complexity is increased when multiple types of client can all access the same data.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a request can be received by a contact cluster of nodes from a client, wherein the request is to access an object, wherein the object is accessible by a plurality of network protocols, wherein the client is associated with a client network protocol, a user identifier, a group identifier, an access zone, a performance profile, and a geographic zone. It can be determined if the object is associated with a multi-protocol redirection link based on a contact cluster path associated with the object. In response to determining the object is associated with the multi-protocol redirection link, a multi-protocol redirection table associated with the object can be accessed. Using the multi-protocol redirection table, a redirection path can be generated based on the client network protocol, the user identifier, the group identifier, the access zone, the performance profile, and the geographic zone. It can be determined whether the client network protocol is associated with client driven redirect, server pass-through redirect, or hybrid pass through redirect.

In accordance with an aspect, in response to determining that the client network protocol is associated with client driven redirect, a message can be sent to the client that instructs the client to retrieve the object at a location associated with the redirection path.

In accordance with an aspect, in response to determining that the client network protocol is associated with server pass-through redirect, a request can be sent from the contact cluster of nodes to a data host associated with the redirection path that requests a redirect object associated with the redirection path. The redirect object can be received. The redirect object can be transparently sent to the client as the object.

In accordance with an aspect, in response to determining that the client network protocol is associated with hybrid pass-through redirect, a request can be sent from the contact cluster of nodes to a NameNode associated with the redirection path that requests a redirect DataNode location associated with the redirection path. A redirect DataNode location can be received. A message to client can be sent that instructs the client to transparently retrieve the redirect object as the object based on the redirect DataNode location and the redirect path.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "Access Zone" as used within this specification refers to a form of multi-tenancy that effectively partitions a single file system into trees that can act like distinct separate file systems to connected clients. Different access zones can have separate overlapping root directories, and can be affiliated with a distinct protocol. It can be appreciated that an admin access zone can be established for the root directory of the entire file system that can encompass all other access zones of the file system. Access zones can be associated with a set of unique IP addresses whereby clients connecting to the file system can be assigned an access zone based on the IP address of their connection. Access zones can be configurable to establish customizable authentication procedures, backup and recovery settings, data services, etc.

The term "inode," as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode "LIN" mappings that describe the physical location of the data stored within the file system. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes. Implementations herein also refer to clusters of nodes being in contact with differing cluster of nodes. It can be appreciated that separate clusters of nodes are responsible for separate namespaces and have differing inode data, even if the clusters store the same data.

Implementations are provided herein for establishing multi-protocol redirection links that are associated with an object, a file, a set of files, directories, etc. The multi-protocol redirection link can transparently redirect a client to a different part of the namespace or even to a different storage cluster to access data. For example, using multi-protocol redirection links, a single namespace in a cluster of nodes can be scaled up with multiple secondary storage clusters being the eventual redirect path. A multi-protocol redirection table can be established as a basis for the multi-protocol redirection link. The file system can be aware of discriminative information associated the client, for example, the network protocol the client is using, the access zone the client is connecting to, user identification of the client, group identification of the client, geography of the client, etc. This discriminative information can then be used to establish dynamic multi-protocol redirection links in the multi-protocol redirection table for any host of eventualities. It can be appreciated that by having a single multi-protocol redirection link associated with a file and/or directory, no matter how the client is accessing the content, no matter the state of the file system, the multi-protocol redirection link can transparently redirect the client to the appropriate redirect path.

In another implementation, the file system state can be used to select a performance profile as a basis for the multi-protocol redirection link. For example, read only workloads could use dynamic load balancing information to redirect the client to an available node and/or to an available secondary cluster of nodes to access data. In another implementation, when data associated with an object or file is loaded into cache memory for any number of other purposes, an entry in a multi-protocol redirection table associated with the file or object can be added that redirects clients to the location in cache memory to access that data. It can be appreciated that accessing data directly from cache memory can improve the performance of the client.

It can be appreciated that each network protocol is unique in how it interacts with clients and how data is requested and sent between the client and the data storage system. Network protocols can be associated with client driven redirect, server pass-through redirect, or hybrid pass-through redirect that governs how the file system processes a multi-protocol redirection link based on the network protocol associated with the client.

In one implementation, network protocols associated with client driven redirect can have multi-protocol redirection links processed by sending a message to client that instructs the client to retrieve the object at a location associated with the redirection path.

In one implementation, network protocols associated with server pass-through redirect can have multi-protocol redirection links processed by sending a request from the contact cluster of nodes to a data host associated with the redirection path that requests a redirect object associated with the redirection path. The redirect object can then be received by the contact cluster of nodes and transparently sent to the client as the original requested object.

In one implementation, network protocols associated with hybrid pass-through redirect can have multi-protocol redirection links processed by sending a request from the contact cluster of nodes to a network protocol metadata repository (e.g. a NameNode in HDFS) associated with the redirection path that requests a redirect location (e.g., DataNode location(s) in HDFS) associated with the redirection path. The contact cluster can receive the redirect location (e.g., DataNode location(s)) and transparently send a message to client that instructs the client to retrieve the redirect object as the object based on the redirect location (e.g., DataNode location(s)) and the redirect path.

Figure 1:
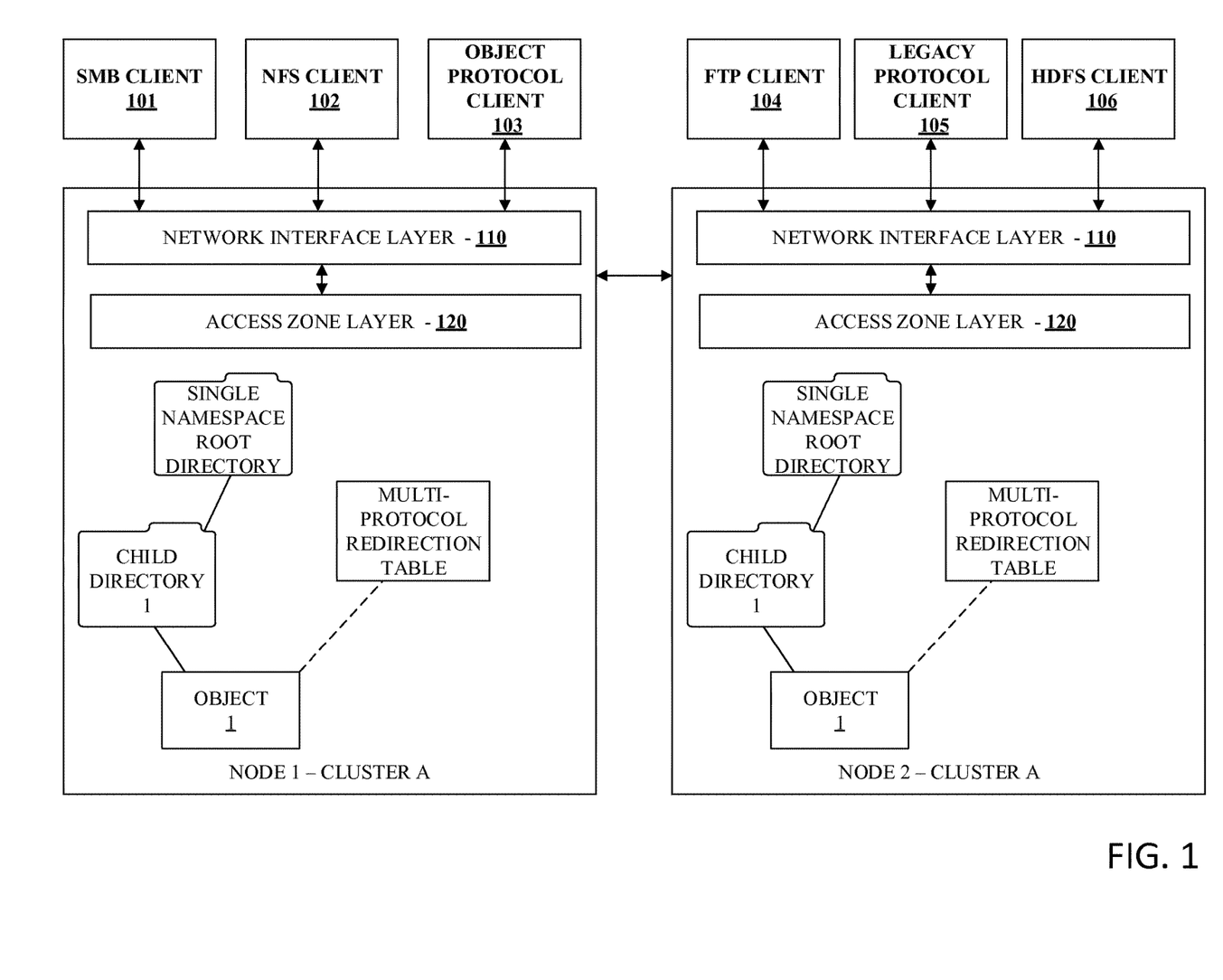
FIG. 1 illustrates an example of two nodes among a cluster of nodes with example clients connecting to the nodes.

Referring now to FIG. 1, there is illustrated an example of two nodes among a cluster of nodes with example clients connecting to the nodes. It can be appreciated that Nodes and a Cluster of Nodes are modeled in more detail and explained below with regards to FIGS. 8-9. Both depicted nodes (Node 1 and Node 2) are part of the same cluster: Cluster A.

Each node has a network interface layer 110 that is capable of sending and receiving data to clients using a plurality of network protocols. Example clients can include a Server Message Block ("SMB") client 101, a Network File System ("NFS") client 102, an Object Protocol Client 103 (e.g., REST, S3, Cloud Data Management Interface ("CDMI"), etc.), a File Transfer Protocol ("FTP") client 104, a legacy protocol client 105 (e.g., Network Data Management Protocol ("NDMP")), and a Hadoop Distributed File System ("HDFS") client 106. It can be appreciated that these are just examples of applicable protocols and the implementations disclosed herein are universally applicable.

It can be appreciated that multiple clients can exist for a given network protocol. It can be further appreciated that clients can connect to any node among the cluster of nodes. For example, multiple SMB clients can connect to the cluster of nodes, including one or more connected to Node 1 and one or more also connected to Node 2.

It can also be appreciated that Node 1, Node 2, and any Node among Cluster A can be in communication with each other. Thus, a distributed metadata layer can exist within each node that tracks the block addresses and storage device identifiers for data stored throughout the distributed file system. Additionally, the multi-protocol redirection tables associated with objects, files, and/or directories of the file system can be synched and/or mirrored across nodes of the cluster of nodes. As depicted, Cluster A can have a single common namespace that exists across each node of the cluster of nodes. Thus, SMB clients and HDFS clients can share the same single namespace.

It can further be appreciated that upon establishing a connection with a node, a client is associated with a set of discriminative information associated with either the client or the cluster of nodes. For example, during an authentication process that allows the client to connect to a node, a user identifier and/or a group identifier can be established for the client. An access zone can be associated with the client. The client's IP address or other client session information can establish a geographic location of the client. The client can be associated with a desired performance profile (e.g., typical usage requirements). In addition, the file system itself can be associated with performance profiles. Data stored within a cache memory may have a different performance profile than data stored on tape backup in a networked NDMP server. As discussed below with respect to FIG. 2, a table can be created that can establish dynamic ranges of discriminative client information and file system information that can be used to give a redirect path to a client when it is attempting to access data associated with a multi-protocol redirect link.

For example, in FIG. 1, both the SMB client 101 and the HDFS Client 106 may serve a request through network interface layers 110 of any node among the cluster of nodes to access Object 1, a descendent of Child Directory 1 (a descendent of the single namespace root directory). Through the use of a multi-protocol redirection link, a single object, e.g., Object 1 can exist that any client can request access to; however, depending on the client profile and/or the data profile, the two clients attempting to access Object 1 may be redirected to two different objects. For example, a multi-protocol redirect link for Object 1 could direct all NFS clients to Object A, all SMB clients to object B, and all HDFS clients to Object C. In another example NFS clients with a group identifier of 001 can be redirected to Object D while NFS clients with a group identifier of 002 can be redirect to Object E, while NFS clients with group identifier that does not equal 001 or 002 as well as a client accessing the object using any other protocol can be redirected to Object F. Thus, it can be appreciated that multi-protocol redirect links can be established using multiple interwoven dynamic data ranges for discriminative information the file system will expect to know when a client establishes a connection with the file system.

An access zone layer 120 can partition the namespace or resources to different access zones as one means of multi-tenancy. As discussed below, an access zone affiliated with a client can be used as discriminative parameter in establishing a multi-protocol redirection link. Multi-protocol redirection links could allow a subset of users within an access zone the ability to access data outside the access zone through a redirection link under set circumstances. It can be appreciated that through multi-protocol redirection links, excepts to an access zone can be granted in a one-off basis for any set type of criteria, which can allow the integrity of an Access Zone to be maintained for the majority of its clients.

Figure 2:
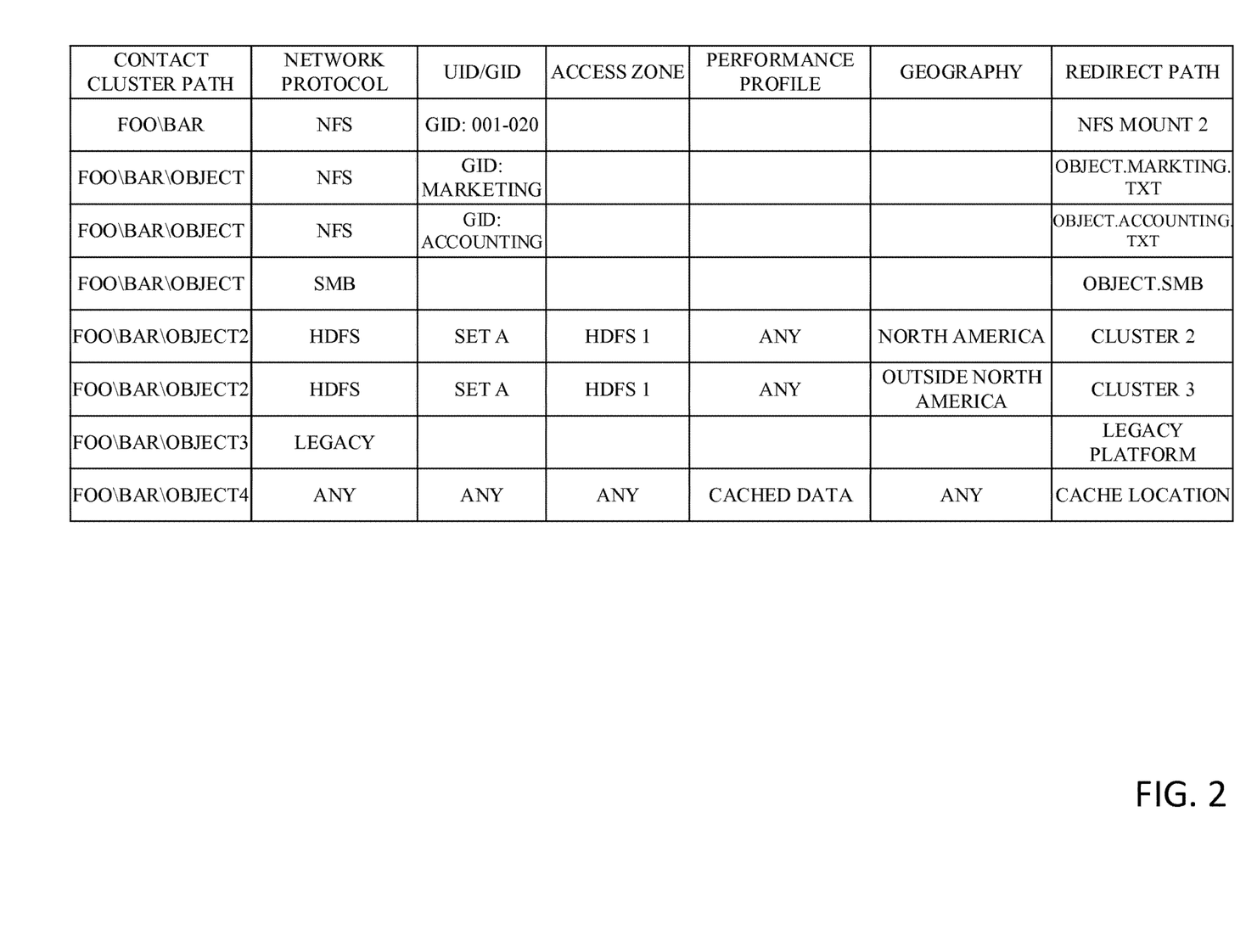
FIG. 2 illustrates an example multi-protocol redirection table in accordance with implementations of this disclosure.

Referring now to FIG. 2, there is illustrated an example multi-protocol redirection table in accordance with implementations of this disclosure. It can be appreciated that this example table is not complete table and instead serves to give examples of possible entries within a multi-protocol redirection table.

It can be appreciated that the purpose of the multi-protocol redirection table is to match a contact cluster path (e.g., the object/file/directory that a client is requesting) with a redirect path based on a set of discriminative information associated with the client and the file system. For example, an NFS client requesting access to a contact cluster path directory of "FOO\BAR" that has a Group Identifier ("GID") between 001 and 020 would be redirected to an second NFS mount (along with a specific path within the NFS mount not shown in the table). In a second example, an NFS client that is associated with a GID of Marketing that is attempting to access "FOO\BAR\OBJECT" can be redirected to a text document that is tailored to the Marketing department, while an NFS client that is associated with a GID of Accounting that is attempting to access the same object can be redirected to a text document that is tailored to the marketing department. Continuing the example, an SMB client with any credentials that is attempting to access the same "FOO\BAR\OBJECT" may be redirected to OBJECT.SMB.

In another example, two HDFS clients may both request access to "FOO\BAR\OBJECT2." Multi-protocol redirect table can list different redirect paths based on the geographical location of the client. Thus, an HDFS client attempting to access "FOO\BAR\OBJECT2" from North America can be redirected to a second HDFS cluster (e.g., a cluster of nodes that is not a part of the contact cluster of nodes) while an HDFS client from outside North America attempting to access the same object can be redirected to a third HDFS cluster. Thus, it can be appreciated that redirect path can be for paths that exist outside that distributed file system of the contact cluster path. In this example, a set of multi-protocol redirect links for a set of objects that aren't natively stored on the contact cluster of nodes can still be accessed by clients of the contact cluster of nodes using the multi-protocol redirect link. This access can be transparent to the client such that the client is not aware that the data it is sent or the data it retrieves (as discussed further below with respect to FIGS. 3-5) is not stored within the contact cluster of nodes. In this manner, clients can be redirected based on geography to a secondary cluster of nodes that may have a closer physical location and offer better performance.

In another example, a legacy protocol or a proprietary protocol that is not native to the contact cluster of nodes can be supported by associating clients of the legacy protocol to a redirect path associated with the protocol.

In another example, a performance profile associated with either the client and/or the data storage system can be used as discriminative information in establishing a multi-protocol redirect link. In an example of performance data associated with the data storage system, each time data is loaded from stable storage into cache storage, an entry can be added to a multi-protocol redirect table associated with the object that indicates that the data is in cache memory and the redirect path can the location within cache memory where a client can access the data. In this example, I/O can be minimized between stable storage and cache memory, and clients can take advantage of the performance boost in reading data already present in cache memory.

A performance profile can also be associated with the client. For example, a client can be associated with read-only workloads as a part of its performance profile. Entries can be added to the multi-protocol redirect table associated with any "read-only" client that specifies certain nodes that these clients should connect to access the data, thereby load balancing a cluster of nodes.

Figure 3:
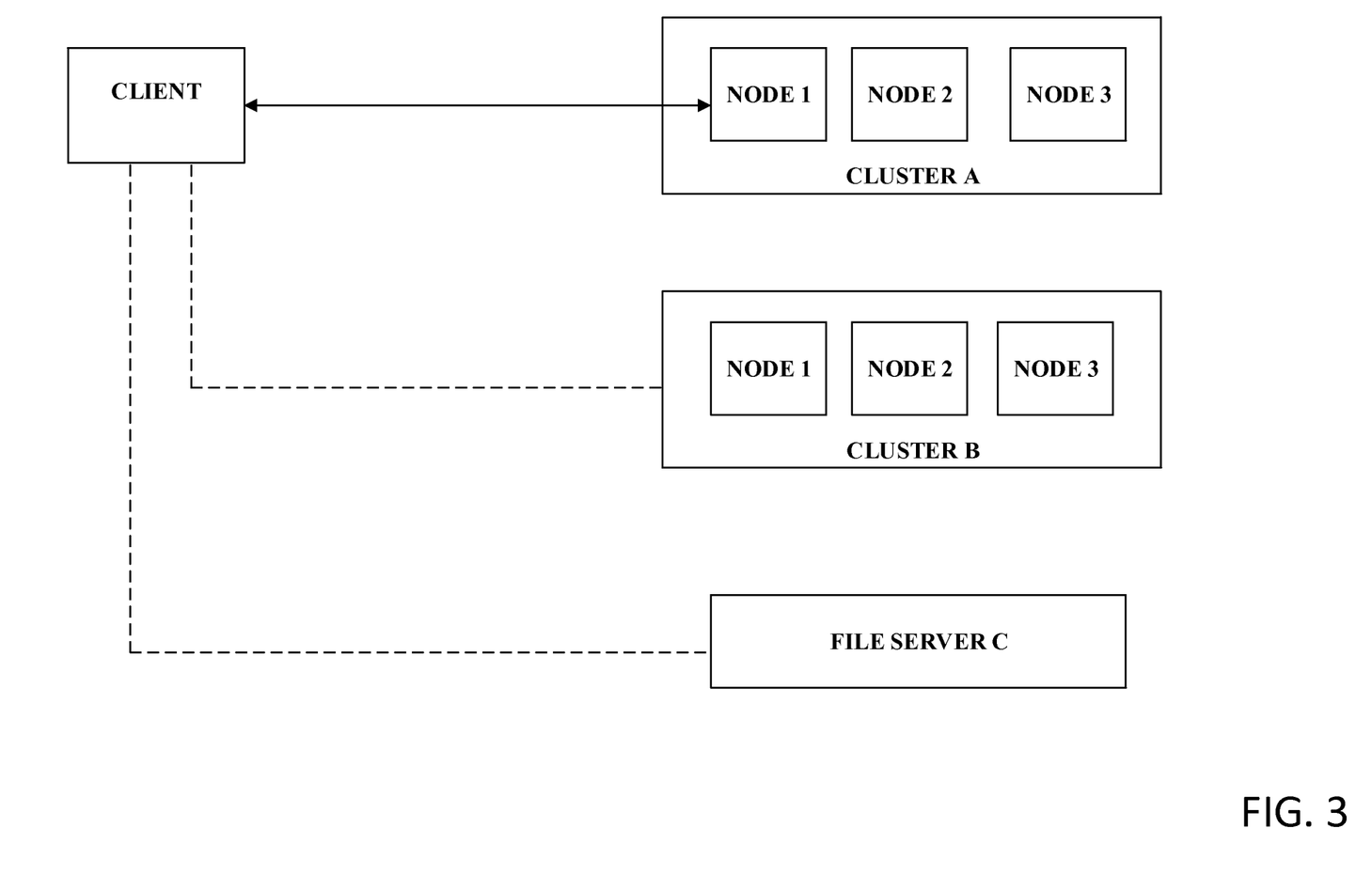
FIG. 3 illustrates an example of client driven redirect in accordance with implementations of this disclosure.

Referring now to FIG. 3, there is illustrated an example of client driven redirect in accordance with implementations of this disclosure. Client driven redirect is designed to facilitate redirect for network protocols that respond to client requests for data with instructions telling the client where to find the data. For example, the client establishes a connection with Node 1 of Cluster A and requests File A. Node 1 first identifies whether File A is associated with a multi-protocol redirect link. If it is, then Node 1 can determine a redirect path (e.g., File A') using the multi-protocol redirect table associated with File A. In client driven redirect, once a redirect path is determined, Node 1 can send a message back to the client telling them to request A' instead. In this example, File A' can be located on a separate Cluster (e.g., Cluster B) or a separate file server (e.g., File Server C). The client itself is responsible for requesting the data from the appropriate source, based on the redirect path sent back to it by Cluster A. Example protocols that work with client driven redirect include SMB 2+ and NFS.

Figure 4:
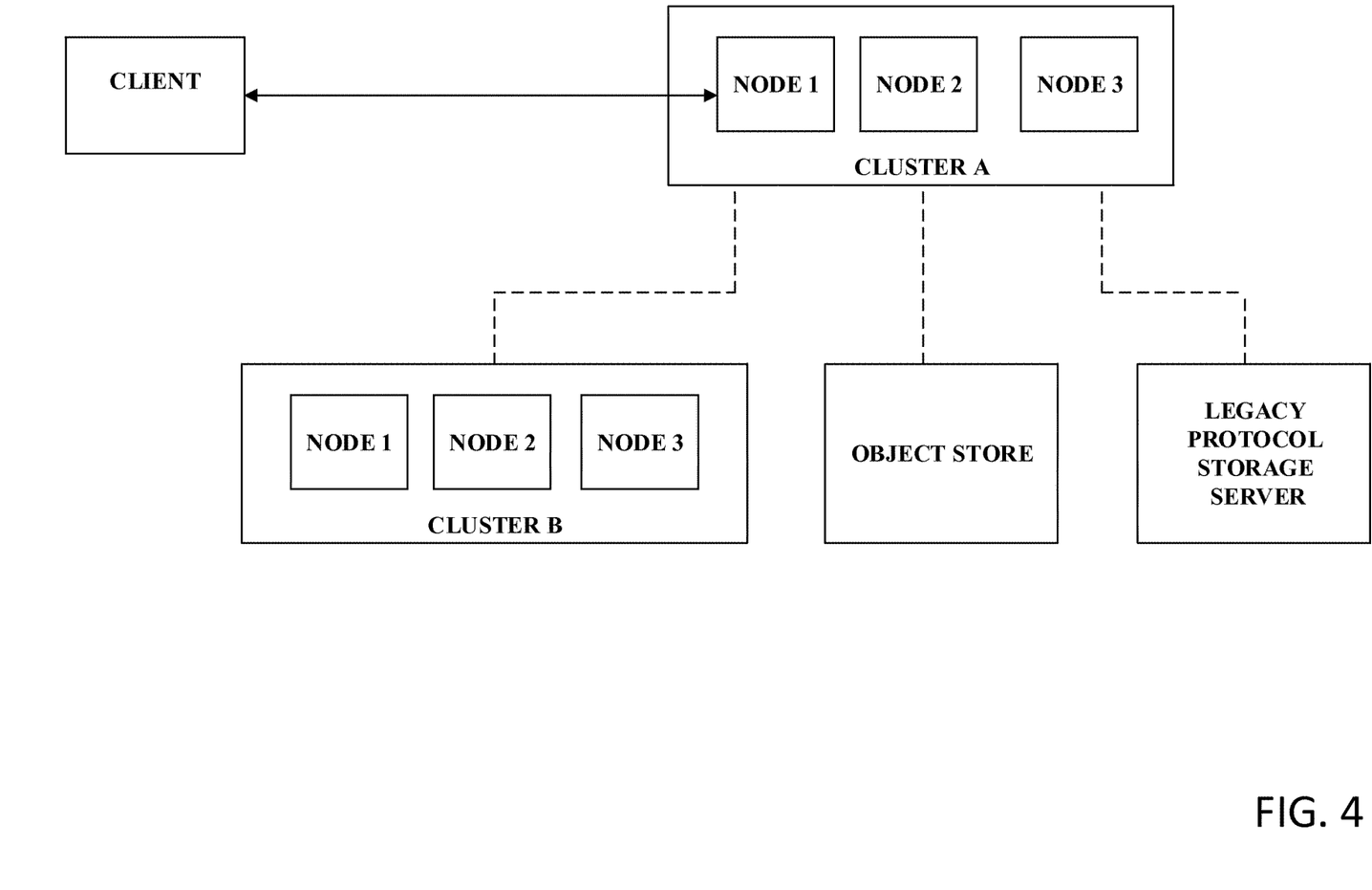
FIG. 4 illustrates an example of server pass-through redirect in accordance with implementations of this disclosure.

Referring now to FIG. 4, there is illustrated an example of server pass-through redirect in accordance with implementations of this disclosure. In server pass-through redirect, the contact cluster of nodes (e.g., Cluster A) does the work of locating and retrieving the data requested by the client and then returns the data to the client. The client is not aware that a secondary transaction occurred where data is retrieved from another source location.

For example, the client establishes a connection with Node 1 of Cluster A and requests File B. Node 1 first identifies whether File B is associated with a multi-protocol redirect link. If it is, then Node 1 can determine a redirect path (e.g., File B') using the multi-protocol redirect table associated with File A. Node 1 of Cluster A can then find the redirect path of File B'. In one example, the redirect path can lead to Cluster B. Continuing the example, Node 1 of Cluster A can establish a connection with Cluster B and request File B' from Cluster B. It can then receive File B' and deliver File B' to the client transparently, such that the client believes it is receiving File B. This same example could work for object stored within an object store (e.g., a public cloud), data within a legacy protocol storage server, or conceivably data from any source. While server pass-through redirect can be the most computational demanding on the contact cluster of the three disclosed redirect processes, it can be appreciated that it can support the widest range of protocols as it only needs to know how to communicate with a secondary cluster or storage site using the native protocol (e.g. The client is "dumb" to any work being processed on its behalf after the client request is made.). Example protocols that work best with server pass-through redirect are FTP, public cloud protocols and NDMP Referring now to FIG. 5, there is illustrated an example of hybrid pass-through redirect in accordance with implementations of this disclosure. The hybrid pass-through redirect is tailored for HDFS clients but could work with similar protocols that operate in a similar manner.

Figure 5:
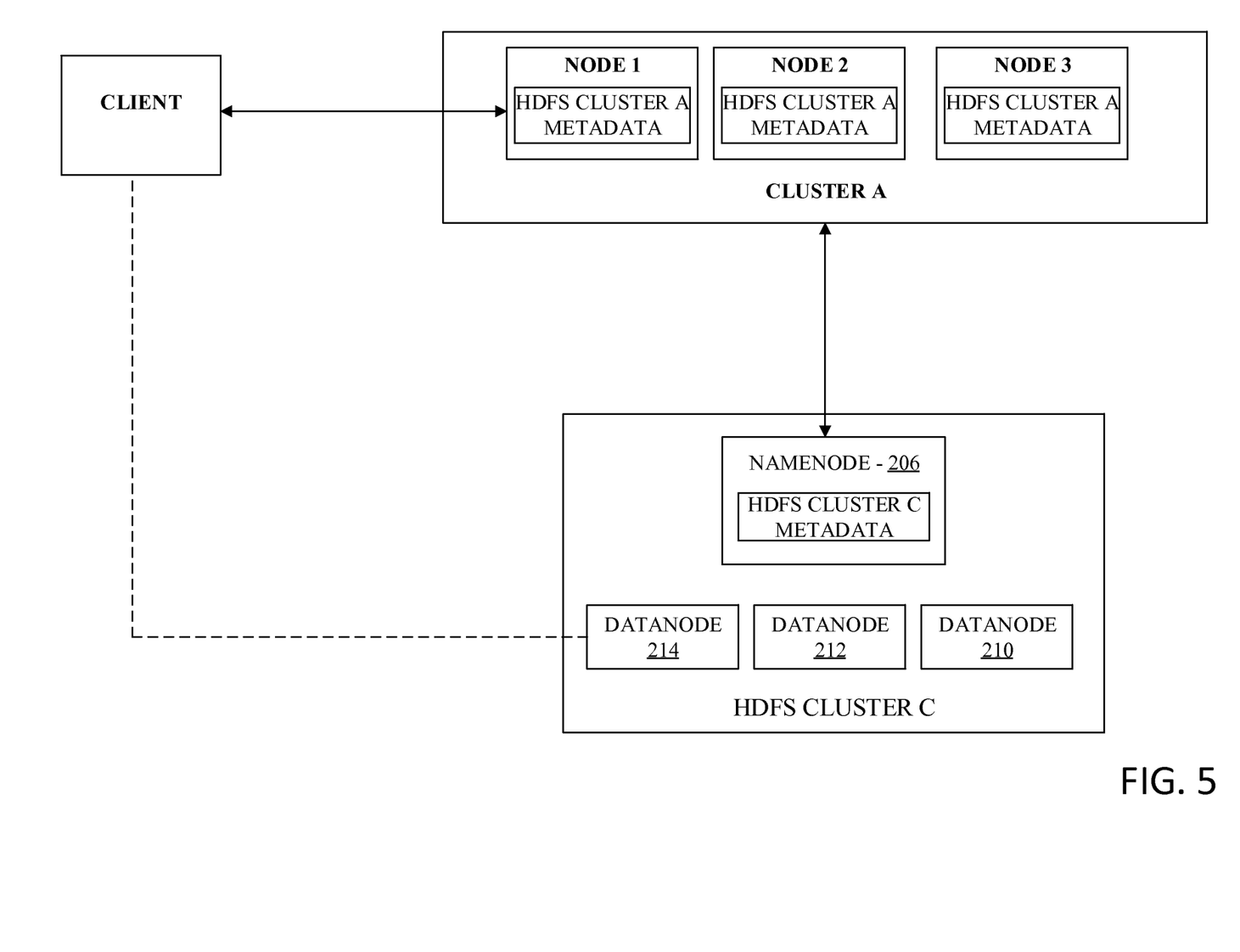
FIG. 5 illustrates an example of hybrid pass-through redirect in accordance with implementations of this disclosure.

A reference HDFS cluster is designed under a master/slave architecture. Each HDFS cluster consists of a single NameNode that acts as a master server that manages the file system namespace and regulates access to files by clients. A plurality of DataNodes operate as slaves to the NameNode, usually configured one per node, that manage storage attached to the DataNode. Within the HDFS cluster, files are split into one or more blocks and these blocks are stored in the set of DataNodes. The NameNode controls operations like opening files, closing files, renaming files and directories, and mapping of blocks to DataNodes. The DataNodes then operate to serve read and write requests made by the clients of the HDFS. DataNodes also perform block creation, deletion, and replication based on instructions received from the NameNode. An HDFS client requesting data will first contact the NameNode to determine the DataNode(s) and associated block addresses where the data is stored. The NameNode returns to the client the DataNode(s) locations. The client will then contact the DataNodes reported by the NameNode 104 as hosting the data, and request the data from the associated block addresses.

A cluster of nodes (e.g., Cluster A) using OneFS operating system as sold by EMC Corporation in its product EMC Isilon can process HDFS requests differently. Each node, running OneFS, can communicate with individual clients and offer access to any file stored within the OneFS distributed file system. For example, as discussed above, a Client that is connected to Node 1 can ask for a file that is stored anywhere within the distributed file system. The file is associated with an inode, and Node 1, using the contents in the inode and/or data structures referenced by the inode, can determine which nodes host the data blocks that make up the file. Node 1 can then communicate with other nodes using the cluster communication backplane to store/retrieve data to/from node 2, node 3, etc. as requested and/or needed by Client 1. In this sense, Cluster A isn't a master/slave architecture like an HDFS file system, but rather any node can receive operations from a client and act on them immediately without having to receive a "NameNode" request and then instruct the client which DataNodes to retrieve data from.

An HDFS Client can send out a NameNode request to Node 1 asking for the location (e.g., DataNodes) where the data it wishes to access is stored. It can then be determined whether a multi-protocol redirection link is associated with the data. If it is, and the redirect path is local to Cluster A, an HDFS protocol component (not pictured) in Node 1 can receive the process the NameNode request, as it can be appreciated that as every node in Cluster A is capable of receiving file storage requests and fulfilling them. Thus Node can return to Client 1 a specific node in Cluster A where the files/data associated with the redirect path are stored.

In another example, where the redirect path is not local to Cluster A, and instead is associated with an HDFS Cluster C, Node 1 of Cluster A can communicate with HDFS Cluster C as an HDFS client and request the DataNode locations within HDFS cluster C where the data associated with the redirect path is stored. After receiving the DataNode locations, Cluster A can then send back the DataNode locations to the client as if the DataNodes were native to Cluster A (acting as a NameNode to the client). Thus, it can be appreciated that multi-protocol redirect links can be used to link to a plurality of secondary HDFS storage clusters, effectually scaling out data storage of the entire grouping while continuing to use Cluster A as a contact point for the HDFS clients that are really seeking to access data residing in the plurality of secondary HDFS clusters.

It can be appreciated that hybrid-pass through is not limited to HDFS implementations, other network protocols associated with hybrid pass-through redirect can have multi-protocol redirection links processed by sending a request from the contact cluster of nodes to a network protocol metadata repository (e.g. a NameNode in HDFS) associated with the redirection path that requests a redirect location (e.g., DataNode location(s) in HDFS) associated with the redirection path. The contact cluster can receive the redirect location (e.g., DataNode location(s) in HDFS) and transparently send a message to client that instructs the client to retrieve the redirect object as the object based on the redirect location (e.g., DataNode location(s) in HDFS) and the redirect path. Thus, it can be appreciated that other Master/Slave protocol architectures can be accommodated in a similar manner.

Figure 6:
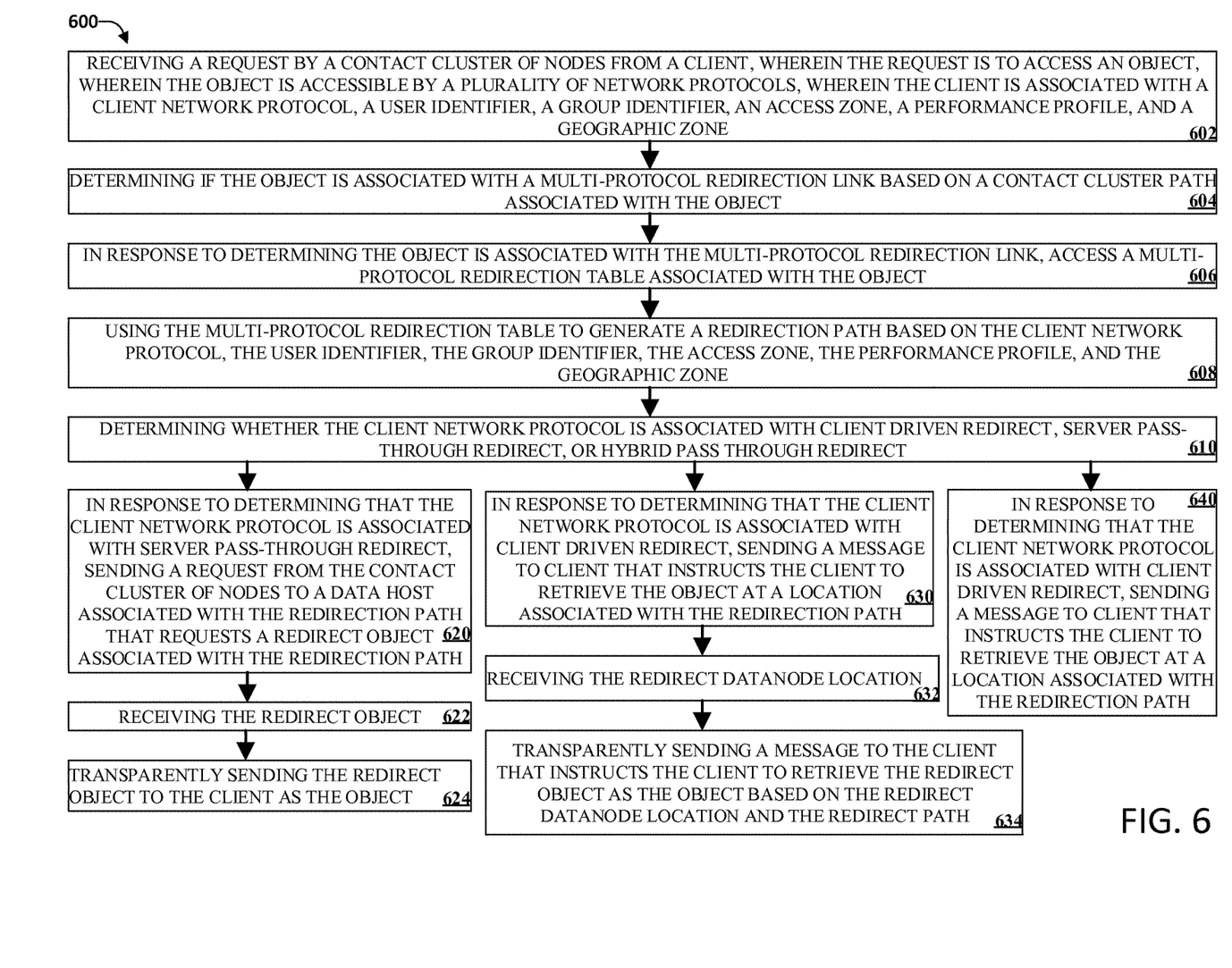
FIG. 6 illustrates an example method for processing a multi-protocol redirection link in accordance with implementations of this disclosure.
Figure 7:
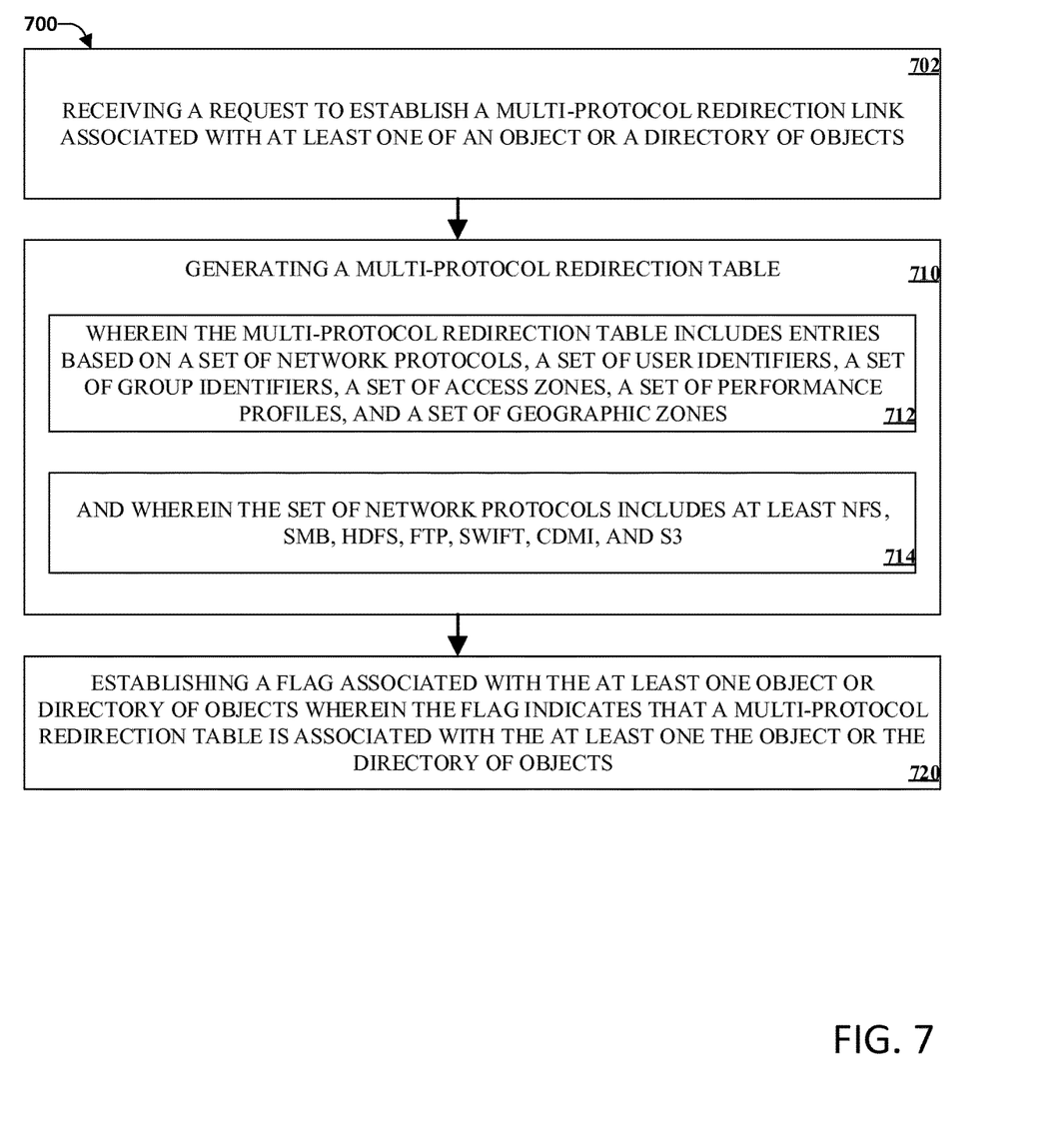
FIG. 7 illustrates an example method for establishing a multi-protocol redirection link in accordance with implementations of this disclosure.

FIG. 6-7 illustrate methods and/or flow diagrams in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 6 illustrates an example method for processing a multi-protocol redirection link in accordance with implementations of this disclosure.

At 602, a request can be received by a contact cluster of nodes from a client, wherein the request is to access an object, wherein the object is accessible by a plurality of network protocols, wherein the client is associated with a client network protocol, a user identifier, a group identifier, an access zone, a performance profile, and a geographic zone. At 604, it can be determined if the object is associated with a multi-protocol redirection link based on a contact cluster path associated with the object. At 606, in response to determining the object is associated with the multi-protocol redirection link, a multi-protocol redirection table associated with the object can be accessed. At 608, using the multi-protocol redirection table a redirection path can be generated based on the client network protocol, the user identifier, the group identifier, the access zone, the performance profile, and the geographic zone. In one implementation, the redirect path can be associated with a redirection cluster of nodes that operates under a separate non-overlapping namespace than the contact cluster of nodes. For example, while the redirect path on the contact cluster of nodes may reference the separate non-overlapping namespace, the two distinct files systems do not share common LIN's for data, do not synch and/or mirror file system metadata, and generally operate independent of each other.

At 610, it can be determined whether the client network protocol is associated with client driven redirect, server pass-through redirect, or hybrid pass through redirect.

At 620, in response to determining that the client network protocol is associated with server pass-through redirect, a request can be sent from the contact cluster of nodes to a data host associated with the redirection path that requests a redirect object associated with the redirection path. At 622, the redirect object can be received. At 624, the redirect object can be transparently sent to the client as the object.

At 630, in response to determining that the client network protocol is associated with hybrid pass-through redirect, a request can be sent from the contact cluster of nodes to a NameNode associated with the redirection path that requests a redirect DataNode location associated with the redirection path. At 632, the redirect DataNode location can be received. At 634, a message can be sent to the client transparently that instructs the client to retrieve the redirect object as the object based on the redirect DataNode location and the redirect path.

At 640, in response to determining that the client network protocol is associated with client driven redirect, a message can be sent to the client that instructs the client to retrieve the object at a location associated with the redirection path.

FIG. 7 illustrates an example method for establishing a multi-protocol redirection link in accordance with implementations of this disclosure.

At 702, a request can be received to establish a multi-protocol redirection link associated with at least one of an object or a directory of objects. For example, the request can be made using a UI of the distributed file system that allows an administrator or a user to establish a multi-protocol redirection link. In another implementation, a multi-protocol redirection link can be generated automatically by the file system. For example, when data associated with an object is placed into cache memory, a multi-protocol redirection link can be added to the object that redirects clients to cache memory to access the file. In another example, when the data is removed from cache memory, the multi-protocol redirection table entry can be removed.

At 710, a multi-protocol redirection table can be generated. At 712, wherein the multi-protocol redirection table includes entries based on a set of network protocols, a set of user identifiers, a set of group identifiers, a set of access zones, a set of performance profiles, and a set of geographic zones. At 714, wherein the set of network protocols includes at least NFS, SMB, HDFS, FTP, a set of Representational State Transfer ("REST") protocols. Other object oriented protocols such as those supporting public clouds, OpenStack Swift, etc. are also supported. In one implementation, the multi-protocol redirection table can include dynamic data fields that can be changed by a user/administrator as well as static data fields that cannot change. In one implementation, protocols among the set of protocols are associated with one of client driven redirect, hybrid pass-through redirect, or server pass-through redirect.

At 720, a flag can be established with the at least one object or directory of objects wherein the flag indicates that a multi-protocol redirection table is associated with the at least one the object or the directory of objects.

Figure 8:
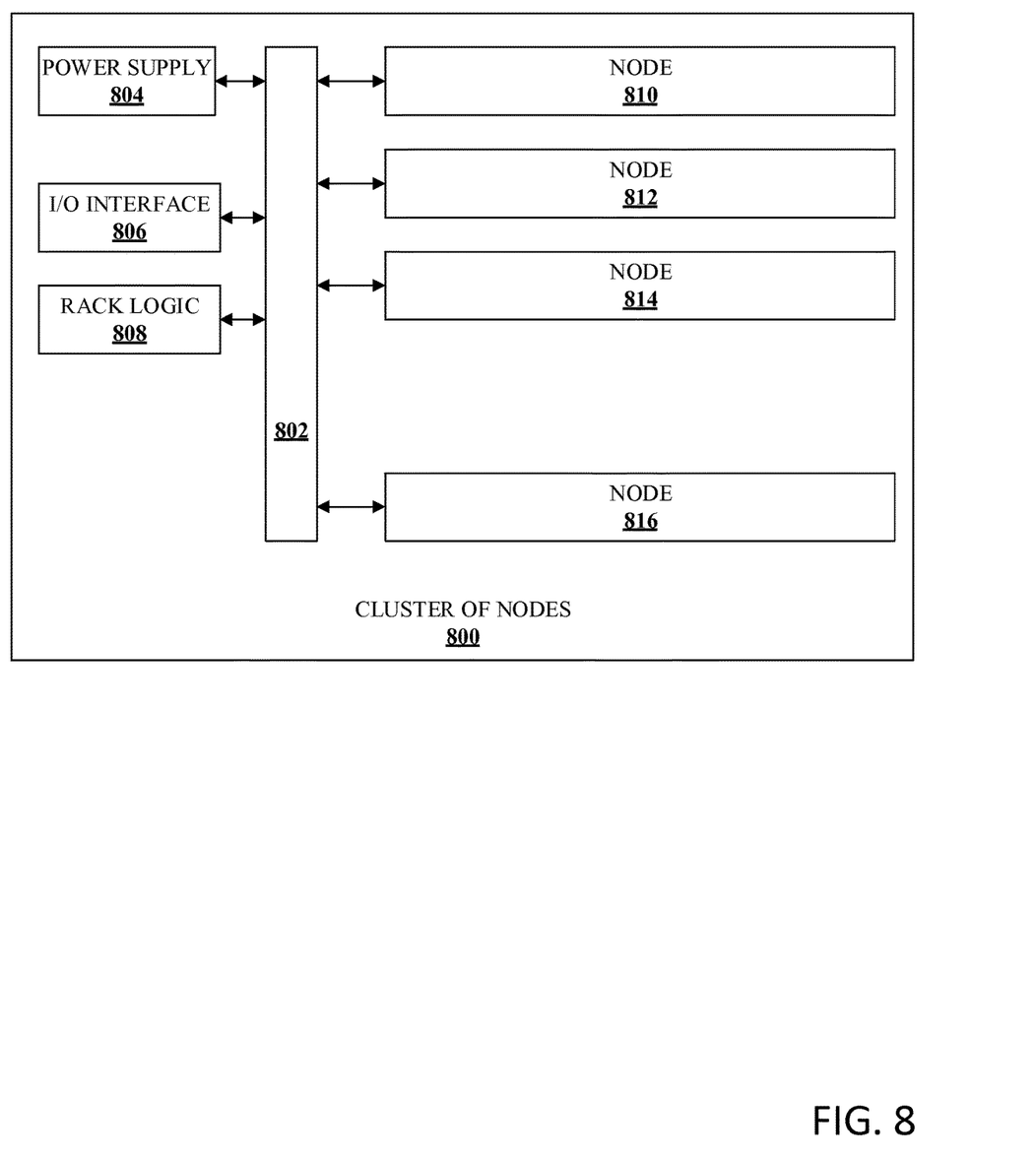
FIG. 8 illustrates an example block diagram of rack of a cluster of nodes in accordance with implementations of this disclosure.

FIG. 8 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 810, 812, 814 and 816 operating in a cluster; however, it can be appreciated that more or less nodes can make up a cluster. It can be further appreciated that nodes among the cluster of nodes do not have to be in a same enclosure as shown for ease of explanation in FIG. 8, and can be geographically disparate. Backplane 802 can be any type of commercially available networking infrastructure that allows nodes among the cluster of nodes to communicate amongst each other in as close to real time as the networking infrastructure allows. It can be appreciated that the backplane 802 can also have a separate power supply, logic, I/O, etc. as necessary to support communication amongst nodes of the cluster of nodes.

As shown in the figure, enclosure 800 contains at least a power supply 804, an input/output interface 806, rack logic 808, several nodes 810, 812, 814, and 816, and backplane 802. Power supply 804 provides power to each component and node within the enclosure. The input/output interface 806 provides internal and external communication for components and nodes within the enclosure. Backplane 808 can enable passive and active communication of power, logic, input signals, and output signals for each node.

It can be appreciated that the Cluster of nodes 800 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 9:
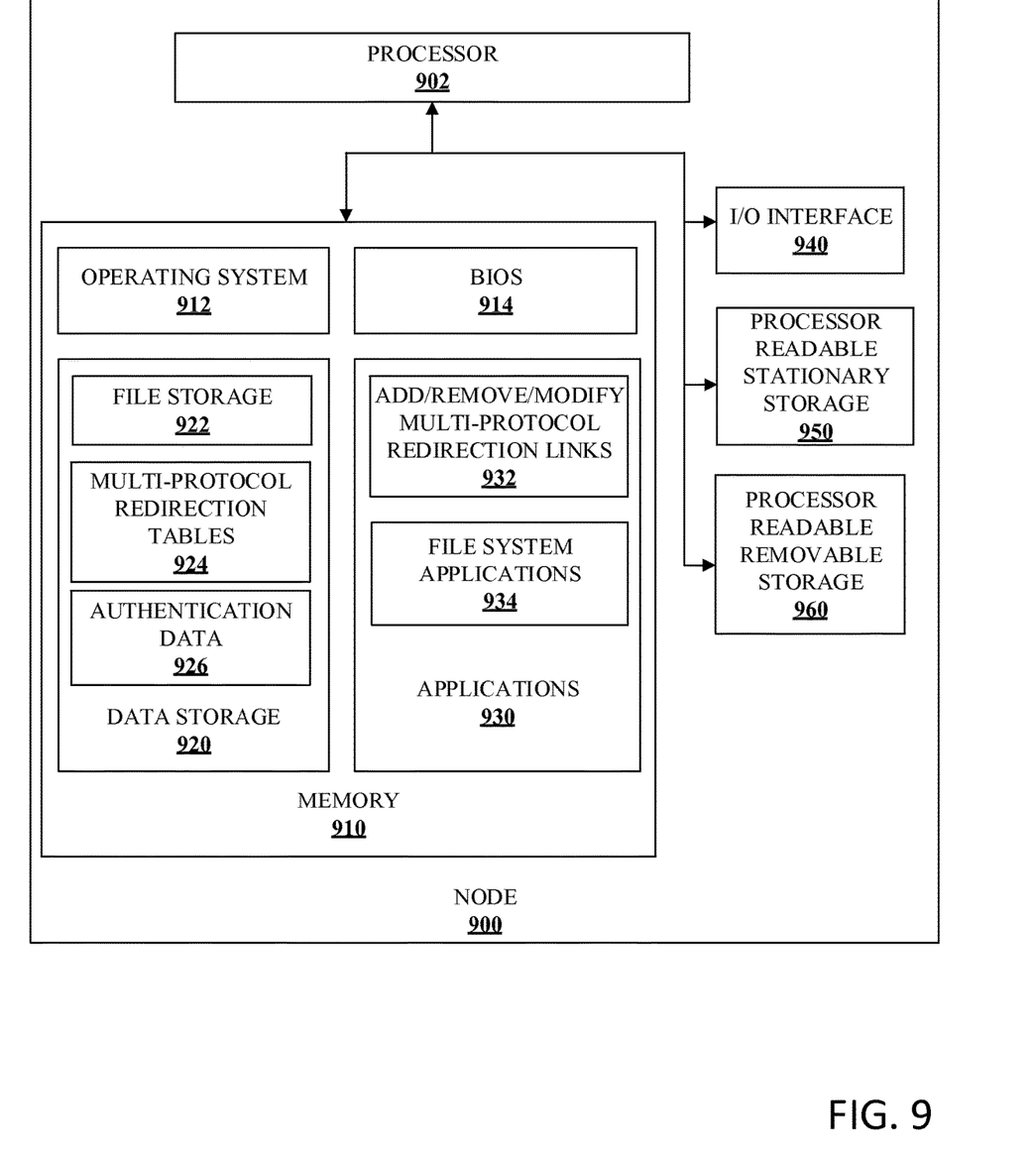
FIG. 9 illustrates an example block diagram of a node in accordance with implementations of this disclosure.

FIG. 9 illustrates an example block diagram of a node 900 in accordance with implementations of this disclosure. As shown in FIG. 8, a plurality of nodes may be included in one enclosure that shares resources provided by the enclosure to reduce size, power, and cost.

Node 900 includes processor 902 which communicates with memory 910 via a bus. Node 900 also includes input/output interface 940, processor-readable stationary storage device(s) 950, and processor-readable removable storage device(s) 960. Input/output interface 940 can enable node 900 to communicate with other nodes, mobile devices, network devices, and the like. Processor-readable stationary storage device 950 may include one or more devices such as an electromagnetic storage device (hard disk), solid state hard disk (SSD), hybrid of both an SSD and a hard disk, and the like. In some configurations, a node may include many storage devices. Also, processor-readable removable storage device 960 enables processor 902 to read non-transitive storage media for storing and accessing processor-readable instructions, modules, data structures, and other forms of data. The non-transitive storage media may include Flash drives, tape media, floppy media, disc media, and the like.

Memory 910 may include Random Access Memory (RAM), Read-Only Memory (ROM), hybrid of RAM and ROM, and the like. As shown, memory 910 includes operating system 912 and basic input/output system (BIOS) 914 for enabling the operation of node 900. In various embodiments, a general-purpose operating system may be employed such as a version of UNIX, LINUX™, a specialized server operating system such as Microsoft's Windows Server™ and Apple Computer's OS X, or the like.

Applications 930 may include processor executable instructions which, when executed by node 900, transmit, receive, and/or otherwise process messages, audio, video, and enable communication with other networked computing devices. Examples of application programs include database servers, file servers, calendars, transcoders, and so forth. Applications 930 may include, for example, file system application 934, and add/remove/modify multi-protocol redirection links 932 according to implementations of this disclosure. For example, an application to add a multi-protocol redirection to a file/object/directory can be used by a user or administrator to establish a new link. It can be appreciated that a UI for such application can exists, such as within a web UI for the distributed file system as a whole.

Human interface components (not pictured), may be remotely associated with node 900, which can enable remote input to and/or output from node 900. For example, information to a display or from a keyboard can be routed through the input/output interface 940 to appropriate peripheral human interface components that are remotely located. Examples of peripheral human interface components include, but are not limited to, an audio interface, a display, keypad, pointing device, touch interface, and the like.

Data storage 920 may reside within memory 910 as well, storing file storage 922 data such as metadata or LIN data and multi-protocol redirection table 924 as disclosed herein, and authentication data 926 that can be used authenticate clients connecting to a node. It can be appreciated that LIN data and/or metadata can relate to rile storage within processor readable stationary storage 950 and/or processor readable removable storage 960. For example, LIN data may be cached in memory 910 for faster or more efficient frequent access versus being stored within processor readable stationary storage 950. In addition, Data storage 920 can also host zone data 204 and token data 206 in accordance with implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    receiving a request by a contact cluster of nodes from a client, wherein the request is to access an object, wherein the object is accessible by a plurality of clients using a plurality of network file protocols and a plurality of network object protocols, wherein the client is associated with a client network protocol, a user identifier, a group identifier, an access zone, a performance profile, and a geographic zone;
    determining if the object is associated with a multi-protocol redirection link based on a contact cluster path associated with the object and dynamic load balancing information, wherein the contact cluster path corresponds to one or more of the object, file, and directory corresponding to the request;
    in response to determining the object is associated with the multi-protocol redirection link, access a multi-protocol redirection table associated with the object;
    using the multi-protocol redirection table to generate a redirection path based on the client network protocol, the user identifier, the group identifier, the access zone, the performance profile, and the geographic zone; and
    determining whether the client network protocol is associated with client driven redirect, server pass-through redirect, or hybrid pass through redirect.

2. The method of claim 1, wherein the multi-protocol redirection table is comprised of at least fields associated with client identifiers, group identifiers, access zones, performance profiles, geographic zones.

3. The method of claim 1, wherein the plurality of network object protocols include at least a cloud data management interface ("CDMI") protocol, and a set of REST protocols.

4. The method of claim 1, wherein the redirection path is associated with a redirection cluster of nodes that operates under a separate non-overlapping namespace than the contact cluster of nodes.

5. The method of claim 1, further comprising:
    in response to determining that the client network protocol is associated with client driven redirect, sending a message to the client that instructs the client to retrieve the object at a location associated with the redirection path.

6. The method of claim 1, further comprising:
    in response to determining that the client network protocol is associated with server pass-through redirect, sending a request from the contact cluster of nodes to a data host associated with the redirection path that requests a redirect object associated with the redirection path;
    receiving the redirect object; and
    transparently sending the redirect object to the client as the object.

7. The method of claim 1, further comprising:
    in response to determining that the client network protocol is associated with hybrid pass-through redirect, sending a request from the contact cluster of nodes to a NameNode associated with the redirection path that requests a redirect DataNode location associated with the redirection path;
    receiving the redirect DataNode location; and
    transparently sending a message to client that instructs the client to retrieve the redirect object as the object based on the redirect DataNode location and the redirect path.

8. A system comprising at least one storage device and at least one hardware processor configured to:

receive a request by a contact cluster of nodes from a client, wherein the request is to access an object, wherein the object is accessible by a plurality of clients using a plurality of network file protocols and a plurality of network object protocols, wherein the client is associated with a client network protocol, a user identifier, a group identifier, an access zone, a performance profile, and a geographic zone;

determine if the object is associated with a multi-protocol redirection link based on a contact cluster path associated with the object and dynamic load balancing information, wherein the contact cluster path corresponds to one or more of the object, file, and directory corresponding to the request;

In response to determining the object is associated with the multi-protocol redirection link, access a multi-protocol redirection table associated with the object;

use the multi-protocol redirection table to generate a redirection path based on the client network protocol, the user identifier, the group identifier, the access zone, the performance profile, and the geographic zone; and determine whether the client network protocol is associated with client driven redirect, server pass-through redirect, or hybrid pass through redirect.

9. The system of claim 8, wherein the multi-protocol redirection table is comprised of at least fields associated with client identifiers, group identifiers, access zones, performance profiles, geographic zones.

10. The system of claim 8, wherein the plurality of network object protocols include at least a cloud data management interface ("CDMI") protocol, and a set of REST protocols.

11. The system of claim 8, wherein the redirection path is associated with a redirection cluster of nodes that operates under a separate non-overlapping namespace than the contact cluster of nodes.

12. The system of claim 8 further configured to:
In response to determining that the client network protocol is associated with client driven redirect, send a message to the client that instructs the client to retrieve the object at a location associated with the redirection path.

13. The system of claim 8 further configured to:
In response to determining that the client network protocol is associated with server pass-through redirect, send a request from the contact cluster of nodes to a data host associated with the redirection path that requests a redirect object associated with the redirection path;
receive the redirect object; and
transparently send the redirect object to the client as the object.

14. The system of claim 8 further configured to:
In response to determining that the client network protocol is associated with hybrid pass-through redirect, sending a request from the contact cluster of nodes to a NameNode associated with the redirection path that requests a redirect DataNode location associated with the redirection path;
receive the redirect DataNode location; and
transparently send a message to client that instructs the client to retrieve the redirect object as the object based on the redirect DataNode location and the redirect path.

15. A non-transitory computer readable medium with program instructions stored thereon to perform the following acts:
receiving a request by a contact cluster of nodes from a client, wherein the request is to access an object, wherein the object is accessible by a plurality of clients using a plurality of network file protocols and a plurality of network object protocols, wherein the client is associated with a client network protocol, a user identifier, a group identifier, an access zone, a performance profile, and a geographic zone;

determining if the object is associated with a multi-protocol redirection link based on a contact cluster path associated with the object and dynamic load balancing information, wherein the contact cluster path corresponds to one or more of the object, file, and directory corresponding to the request;

In response to determining the object is associated with the multi-protocol redirection link, access a multi-protocol redirection table associated with the object;

using the multi-protocol redirection table to generate a redirection path based on the client network protocol, the user identifier, the group identifier, the access zone, the performance profile, and the geographic zone; and determining whether the client network protocol is associated with client driven redirect, server pass-through redirect, or hybrid pass through redirect.

16. The non-transitory computer readable medium of claim 15, wherein the multi-protocol redirection table is comprised of at least fields associated with client identifiers, group identifiers, access zones, performance profiles, geographic zones.

17. The non-transitory computer readable medium of claim 15, wherein the plurality of network object protocols include at least a cloud data management interface ("CDMI") protocol, and a set of REST protocols.

18. The non-transitory computer readable medium of claim 15, wherein the redirection path is associated with a redirection cluster of nodes that operates under a separate non-overlapping namespace than the contact cluster of nodes.

19. The non-transitory computer readable medium of claim 15, with program instructions stored thereon to further perform the following acts:
In response to determining that the client network protocol is associated with client driven redirect, sending a message to the client that instructs the client to retrieve the object at a location associated with the redirection path.

20. The non-transitory computer readable medium of claim 15, with program instructions stored thereon to further perform the following acts:
In response to determining that the client network protocol is associated with server pass-through redirect, sending a request from the contact cluster of nodes to a data host associated with the redirection path that requests a redirect object associated with the redirection path;
receiving the redirect object; and
transparently sending the redirect object to the client as the object.

21. The non-transitory computer readable medium of claim 15, with program instructions stored thereon to further perform the following acts:
In response to determining that the client network protocol is associated with hybrid pass-through redirect, sending a request from the contact cluster of nodes to a NameNode associated with the redirection path that requests a redirect DataNode location associated with the redirection path;
receiving the redirect DataNode location; and transparently sending a message to client that instructs the client to retrieve the redirect object as the object based on the redirect DataNode location and the redirect path.

\* \* \* \* \*